(12) United States Patent
Ozaki

(10) Patent No.: US 10,854,114 B2
(45) Date of Patent: Dec. 1, 2020

(54) CYPHERTEXT MANAGEMENT METHOD, CYPHERTEXT MANAGEMENT APPARATUS, AND PROGRAM

(71) Applicants: REAL TECHNOLOGY INC., Yokohama-shi, Kanagawa (JP); Hiroyuki Ozaki, Yokohama-shi, Kanagawa (JP)

(72) Inventor: Hiroyuki Ozaki, Yokohama (JP)

(73) Assignees: REAL TECHNOLOGY INC., Kanagawa (JP); HIROYUKI OZAKI, Kanagawa (JP)

( * ) Notice: Subject to any disclaimer, the term of this patent is extended or adjusted under 35 U.S.C. 154(b) by 196 days.

(21) Appl. No.: 16/070,423

(22) PCT Filed: Jan. 18, 2017

(86) PCT No.: PCT/JP2017/001608
§ 371 (c)(1),
(2) Date: Jul. 16, 2018

(87) PCT Pub. No.: WO2017/126571
PCT Pub. Date: Jul. 27, 2017

(65) Prior Publication Data
US 2019/0027067 A1    Jan. 24, 2019

(30) Foreign Application Priority Data

Jan. 18, 2016 (JP) .................................. 2016-007309

(51) Int. Cl.
*G06F 21/60* (2013.01)
*G09C 1/00* (2006.01)
(Continued)

(52) U.S. Cl.
CPC ............... *G09C 1/00* (2013.01); *G06F 21/60* (2013.01); *G06F 21/62* (2013.01); *H04L 9/08* (2013.01); *H04L 9/085* (2013.01); *H04L 9/0836* (2013.01)

(58) Field of Classification Search
CPC .. G09C 1/00; H04L 9/08; H04L 9/085; H04L 9/0816; H04L 9/0819; H04L 9/0894;
(Continued)

(56) References Cited

U.S. PATENT DOCUMENTS 8,898,464 B2 * 11/2014 Bono .................. H04L 63/0428
713/168
2014/0229731 A1   8/2014 O'Hare et al.

FOREIGN PATENT DOCUMENTS

CA   2900504 A1   8/2014
EP   2956887 A1   12/2015
(Continued)

OTHER PUBLICATIONS

H. Krawczyk; Secret sharing made short; Crypto 93; 1994; pp. 136-146.
(Continued)

*Primary Examiner* — Paul E Callahan
(74) *Attorney, Agent, or Firm* — Lucas & Mercanti, LLP

(57) ABSTRACT

By introducing inequality to the information dispersal/sharing storage method, a ciphertext management method or the like is provided to support novel ciphertext data management. After the ciphertext and key data are each divided, pairs of the divided ciphertext and key data are generated. Specifically, they are one-to-one paired as with conventional techniques. Furthermore, additional one-to-many pairs are generated. The generated one-to-one pairs provide equality as with conventional techniques. When the number of the one-to-one pairs of the divided ciphertext and key data that
(Continued)

can be used is equal to or greater than a threshold number, both the ciphertext data and the key data can be reconstructed, and accordingly, the secret data can be decoded. In contrast, even when the one-to-many pairs that can be used is equal to or greater than a threshold number, the ciphertext data and/or the key data cannot be reconstructed. This provides inequality.

2 Claims, 4 Drawing Sheets

(51) Int. Cl.
*H04L 9/08* (2006.01)
*G06F 21/62* (2013.01)

(58) Field of Classification Search
CPC ... H04L 9/0861; H04L 9/3093; H04L 63/061; H04L 63/062; H04L 63/0428; H04L 63/065
See application file for complete search history.

(56) References Cited

FOREIGN PATENT DOCUMENTS

| | | |
|---|---|---|
| JP | 2013243441 A | 12/2013 |
| JP | 2014060614 A | 4/2014 |
| WO | 2014127147 A1 | 8/2014 |

OTHER PUBLICATIONS

K. Takimoto, et al; A content protection method using secret sharing and attribute-based encryption; IEICE Technical Report; vol. 113; No. 135; Jul. 2013; pp. 199-204.

H. Noguchi, et al; Common-key crypto file systems with leveled structure; IEICE Technical Report; vol. 101; No. 728; Mar. 2002; pp. 117-120.

International Search Report dated May 16, 2017 for PCT/JP2017/001608 and English translation.

JPO, Office Action for the corresponding Japanese patent application No. 2016-007309, dated Aug. 5, 2019, with English translation (8 pages).

\* cited by examiner (a)

(b)

(c)

CYPHERTEXT MANAGEMENT METHOD, CYPHERTEXT MANAGEMENT APPARATUS, AND PROGRAM

CROSS REFERENCE TO RELATED APPLICATION

This Application is a 371 of PCT/JP2017/001608 filed on Jan. 18, 2017 which, in turn, claimed the priority of Japanese Patent Application No. 2016-007309 filed on Jan. 18, 2016, both applications are incorporated herein by reference.

TECHNICAL FIELD

The present invention relates to a ciphertext management method, a ciphertext management apparatus and program, and particularly to a ciphertext management method or the like for managing ciphertext data.

BACKGROUND ART

Krawczyk proposed a SS (Secret Sharing) scheme, configured as a combination of the IDA (Information Dispersal Algorithm) proposed by Rabin and the PSS (Perfect Sharing Scheme) proposed by Shamir, which provides a safe encryption scheme from the viewpoint of the amount of calculation (SSMS, see Non-patent document 1). First, secret data is encrypted by means of secret key encryption. The encrypted data is dispersed by means of the IDA, and the secret key is divided by means of the PSS. This allows the size of the shared secret data to be dramatically reduced as compared with an arrangement in which only the Shamir method is applied.

[Dispersal Processing]

(Dis1) First, the secret key K is selected at random. The secret data S is encrypted using an encryption function ENC and the key K as represented by $E=ENC_K(S)$.

(Dis2) E is divided into $\beta$ multiple pieces, i.e., $E_1$, $E_2, \ldots, E_\beta$ by means of the IDA($\alpha, \beta$).

(Dis3) The key K is divided into $\beta$ multiple pieces, i.e., $K_1, K_2, \ldots, K_\beta$ by means of the PSS($\alpha, \beta$) proposed by Shamir.

(Dis4) The divided pieces ($E_i$, $K_i$) are distributed to the players $P_i$ ($i=1, 2, \ldots, \beta$). It should be noted that each key $K_i$ must be transmitted to the corresponding player $P_i$ in secret.

[Reconstruction/Decoding Processing]

(Rec1) The players are called and instructed to present the $\alpha$ multiple pairs $S_j$ (j represents an integer of $\alpha$ or less, and $\alpha$ represents an integer of $\beta$ or less).

(Rec2) E is reconstructed based on the $\alpha$ multiple $E_j$ pieces using the IDA.

(Rec3) K is reconstructed based on the $\alpha$ multiple $K_j$ pieces using the PSS.

(Rec4) S is decoded from E using K.

CITATION LIST

Patent Literature

[Non-patent Document 1]
Krawczyk, H. "Secret sharing made short", CRYPTO'93, 1993,

SUMMARY OF INVENTION

Technical Problem

With the information division/dispersal storage methods according to the conventional techniques, the greatest feature is that all the pieces are divided equally. For example, with the dispersal processing in the method described in the Non-patent document 1, the number of $E_i$ is the same as that of $K_i$. Furthermore, the pairs of pieces are generated such that all the different $E_i$ are respectively combined with different $K_i$. Accordingly, each $E_i$ has an equal weight. In the distribution, each player $P_i$ receives the corresponding piece having an equal weight.

However, such equality provided by the information division/dispersal storage method leads to a restriction in practical operation. For example, let us consider a (3, 5)-type secret sharing method described in Non-patent document 1. In this example, the information is divided into five pieces. From among the five pieces thus divided, the original information can be reconstructed based on the three pieces. In this case, in a case in which three staff members who possess these three pieces resign at the same time and take out the files, and the three files fall into the hands of a malicious third party, this has the potential to cause information leakage. As described above, the advantage of the information division/dispersal storage method conventionally designed so as to attach importance to equality conversely becomes a problem from the viewpoint of organization management.

Furthermore, Non-patent document 1 proposes only the need to transmit the keys $K_i$ to the players $P_i$ in secret. That is to say, Non-patent document 1 proposes no satisfactory method for supporting a case in which information leakage of $E_i$ or $K_i$ has occurred.

Accordingly, it is a purpose of the present invention to provide a ciphertext management method or the like for supporting novel ciphertext data management by introducing inequality to the information dispersal/sharing storage method.

Solution of Problem

A first aspect of the present invention relates to a ciphertext management method for managing ciphertext data. The ciphertext management method comprises: encrypting, by means of an encryption unit included in a ciphertext management apparatus, secret data using key data so as to generate the ciphertext data; dividing, by means of a dividing unit included in the ciphertext management apparatus, the ciphertext data and the key data so as to generate m (m represents an integer) pieces of divided ciphertext data and n (n represents an integer) pieces of divided key data; and linking, by means of a distribution unit included in the ciphertext management apparatus, the divided ciphertext data and the divided key data. In the linking, equal pairs are generated such that each piece of divided ciphertext data and each piece of divided key data are used only once to perform pairing. In addition, unequal pairs are generated such that one piece from among at least one from among the divided ciphertext data and the divided key data is used multiple times to perform pairing.

A second aspect of the present invention relates to the ciphertext management method according to the first aspect. In the dividing, the number of the pieces of divided ciphertext data differs from the number of pieces of the divided key data. In the linking, in a case in which n>m, the distribution unit respectively pairs the (m−1) pieces of divided ciphertext data with the (m−1) pieces of divided key data so as to generate (m−1) equal pairs, and pairs the other (n−m+1) pieces of divided ciphertext data with the remaining one piece of divided key data so as to generate (n−m+1) unequal pairs. In the linking, conversely, in a case in which n<m, the distribution unit respectively pairs the (n−1) pieces of divided ciphertext data with the (n−1) pieces of divided key data so as to generate (n−1) equal pairs, and pairs the remaining one piece of divided ciphertext data with the remaining (m−n+1) pieces of divided key data so as to generate (m−n+1) unequal pairs.

A third aspect of the present invention relates to the ciphertext management method according to the first or second aspect. In the dividing, the dividing unit divides the ciphertext data and the key data such that the ciphertext data can be reconstructed based on s (s represents an integer that is equal to or greater than 2 and that is smaller than m) pieces of divided ciphertext data, and such that the key data can be reconstructed based on t (t represents an integer that is equal to or greater than 2 and that is smaller than n) pieces of divided key data. In the linking, all the unequal pairs are generated such that the number of the pieces of divided ciphertext data to be used is smaller than s and/or the number of the pieces of divided key data to be used is smaller than t.

A fourth aspect of the present invention relates to a ciphertext data management apparatus configured to manage ciphertext data. The ciphertext data management apparatus comprises: an encryption unit configured to encrypt secret data using key data so as to generate the ciphertext data; a dividing unit configured to divide the ciphertext data and the key data into multiple pieces of divided ciphertext data and multiple pieces of divided key data; and a distribution unit configured to generate pairs of the piece of divided ciphertext data and the piece of divided key data. The pairs comprise: equal pairs generated such that each piece of divided ciphertext data and each piece of divided key data are used only once to perform pairing; and unequal pairs generated such that one piece from among at least one from among the divided ciphertext data and the divided key data is used multiple times to perform pairing.

A fifth aspect of the present invention relates to a computer program configured to instruct a computer to function as the ciphertext management apparatus according to the fourth aspect.

It should be noted that the present invention may be configured as a computer-readable recording medium for storing the program according to the fifth aspect.

Also, the present invention may be configured including an holding operation in which the distribution unit instructs a holding apparatus to hold the pairs of the divided ciphertext data and the divided key data. Here, the holding apparatus may be configured as an information processing apparatus owned by a player such as a personal computer or a smartphone. Also, the holding apparatus may be configured as a server to be accessed by a player by means of communication. Also, the holding apparatus may be configured as a storage apparatus such as USB memory or the like that stores information.

For example, in a case in which the holding apparatus is configured as a server, when the server is accessed by a player, judgment is made regarding whether or not the player has been permitted to access the server via an appropriate user authentication. By controlling the access permission/prohibition, this arrangement is capable of protecting secret data from leakage.

Furthermore, by storing the equal pairs and the unequal pairs in different storage apparatuses at geographically different positions, and since the arrangement allows each player to reconstruct and decode the secret data based on the pieces of divided ciphertext data and the divided keys received from the multiple storage apparatuses according to the user's access rights, it provides a system with improved fault tolerance and disaster resistance.

Advantageous Effects of Invention

With each aspect of the present invention, in addition to the equal pairs, unequal pairs are generated. This provides novel security management based on the information dispersal/sharing storage method.

Description will be made regarding an example in which the pieces of divided ciphertext data and the pieces of divided key data are generated based on the (3,5)-type secret sharing scheme. In this example, the encrypted data and the key data are each divided into five pieces. The ciphertext data or the key data can be reconstructed based on three pieces of the corresponding divided data. In this case, the secret data can be reconstructed based on three equal pairs. This provides equality as with conventional techniques. In contrast, the secret data cannot be reconstructed even if three unequal pairs are acquired. That is because the three unequal pairs include the same piece of data. This provides inequality.

Furthermore, with the second aspect of the present invention, respective different pieces of divided ciphertext data or otherwise respective different pieces of divided key data are used to generate the unequal pairs. Accordingly, if leakage of the unequal information pairs occurs, judgement can be made regarding who has leaked the information.

Furthermore, with the third aspect of the present invention, even if all the unequal pairs are acquired, the number of the different pieces of divided ciphertext data is smaller than s and/or the number of the different pieces of divided key data is smaller than t. In this case, the secret data cannot be reconstructed. Accordingly, by protecting the equal pairs from leakage, this arrangement is capable of maintaining a secret state. This allows the security management burden to be dramatically reduced.

It should be noted that Shamir has proposed a hierarchical structure in which the number of pieces of data to be shared by a shared-data recipient is adjusted according to the level of importance of the shared-data recipient. In such a method proposed by Shamir, the upper-level recipient has a privilege to reconstruct the secret data by himself or herself. However, if a particular number of lower-level recipients cooperate with each other, the secret data can be reconstructed. Accordingly, this arrangement is not capable of protecting the secret data from leakage. In contrast, with the present invention, in order to protect the secret data from leakage, this arrangement provides a structure such that the lower-level recipients cannot generate the secret data by themselves even if this structure has the same hierarchical structure.

DESCRIPTION OF EMBODIMENTS

Description will be made below with reference to the drawings regarding an embodiment of the present invention. It should be noted that the embodiment of the present invention is by no means restricted to the following example.

Example

Description will be made assuming that an organization has a single team. The team has a leader and multiple followers. Furthermore, the top of the organization remotely manages the team.

Figure 1:
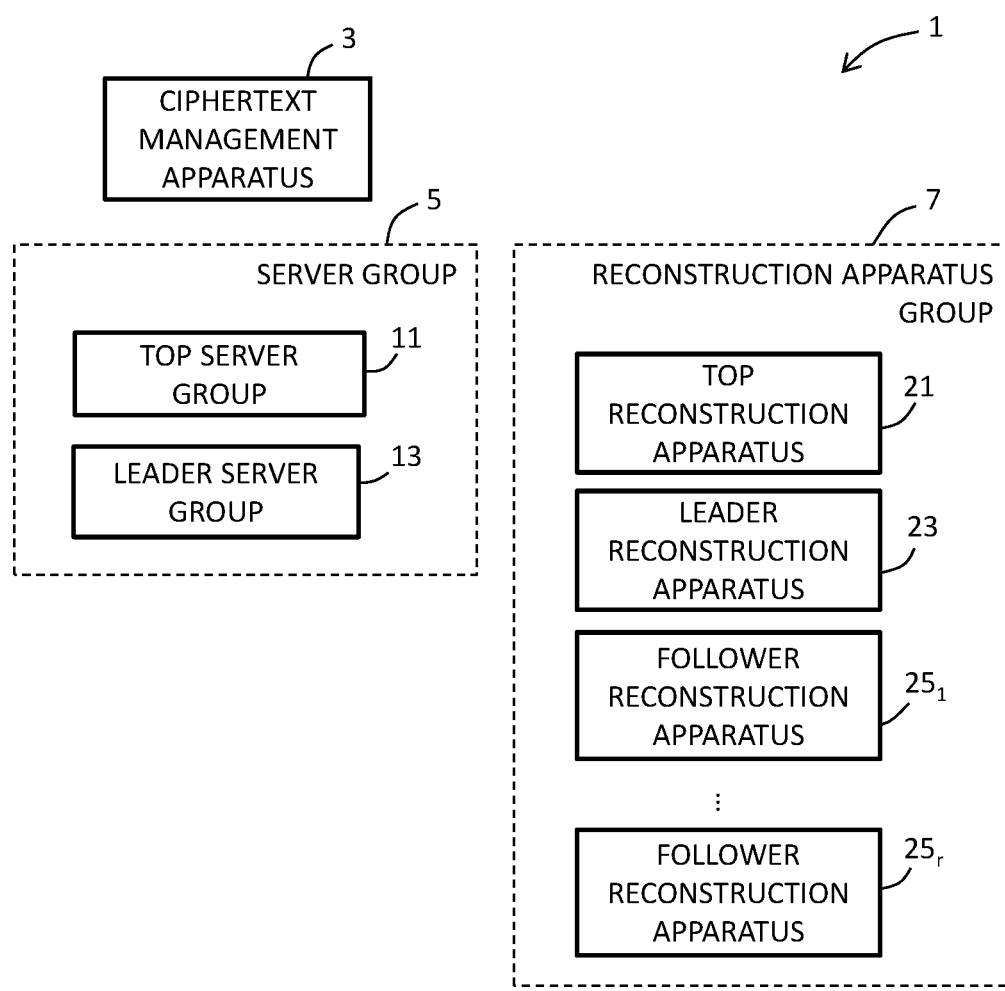
FIG. 1 is a diagram showing an example of a ciphertext management system according to an embodiment of the present invention.

FIG. 1 is a diagram showing an example of a ciphertext management system according to an embodiment of the present invention. A ciphertext management system 1 includes a ciphertext management apparatus 3 (an example of the "ciphertext management apparatus" in the present claims), a server group 5 (an example of the "holding apparatus" in the present claims), and a reconstruction apparatus group 7.

The server group 5 includes a top server group 11 and a leader server group 13.

The reconstruction apparatus group 7 includes a top reconstruction apparatus 21, a leader reconstruction apparatus 23, and follower reconstruction apparatuses $25_1, \ldots, 25_r$. It should be noted that, in some cases, the index appended to each reference symbol is omitted. Each reconstruction apparatus is configured as a personal computer or the like, to be used by the corresponding player. It should be noted that the ciphertext data, the key data, and the secret data are not stored on a hard disk or the like. Instead, such data is temporarily stored in memory or the like, in order to protect the data from leakage.

The top server group 11 is configured as a single server or otherwise multiple servers to be managed by the top. In a case in which a given player other then the top acquires permission from the top, the given player is able to access the information stored in the top server group 11. The top reconstruction apparatus 21 is a reconstruction apparatus to be used by the top.

The leader server group 13 is configured as a single server or otherwise multiple servers to be managed by the leader. In a case in which a given follower acquires permission from the leader, the given follower is able to access the information stored in the leader server group 13. The leader reconstruction apparatus 23 is a reconstruction apparatus to be used by the leader.

The follower reconstruction apparatuses 25 are each configured as a reconstruction apparatus to be used by the corresponding follower.

The ciphertext management apparatus 3 generates a ciphertext using the key data. Furthermore, the ciphertext management apparatus 3 divides the ciphertext data and the key data, and distributes pairs of the divided ciphertext data and the divided key data to the server groups 5 or the reconstruction apparatus group 7. The servers and the reconstruction apparatuses each receive the corresponding pair of the divided ciphertext data and the divided key data from the ciphertext management apparatus 3, and each store the data pair thus received. The reconstruction apparatus reconstructs the ciphertext data and the key data from the divided ciphertext data and the divided key data, and decodes the secret data from the ciphertext data using the key data. In the following description, in some cases, the term "data" will be omitted for simplicity of description. Here, "pairing" represents both a case in which two pieces of data are physically combined as a single unit ("link" as ordinarily used in the computer field) and a case in which two pieces of data are simply handled as a data pair ("link" as a general term).

FIG. 2A is a block diagram showing an example configuration of the ciphertext management apparatus 3. FIG. 2B is a block diagram showing an example configuration of each server of the server group 5. FIG. 2C is a block diagram showing an example configuration of each reconstruction apparatus of the reconstruction apparatus group 7. FIG. 3A is a flowchart showing an example of the operation of the ciphertext management apparatus 3. FIG. 3B is a flowchart showing an example of the operation of the server. FIG. 3C is a flowchart showing an example of the operation of each of the top reconstruction apparatus 21, the leader reconstruction apparatus 23, and the follower reconstruction apparatus 25.

Referring to FIGS. 2A and 3A, description will be made regarding an example of the configuration and the operation of the ciphertext management apparatus.

The ciphertext management apparatus 31 includes a secret data storage unit 33, a key storage unit 35, a ciphertext storage unit 37, a divided ciphertext storage unit 39, a divided key storage unit 41, an encryption unit 43 (an example of the "encryption unit" in the present claims), a dividing unit 45 (an example of the "dividing unit" in the present claims), and a distribution unit 47 (an example of the "distribution unit" in the present claims).

The secret data storage unit 33 stores the secret data. The key storage unit 35 stores the key.

The encryption unit 43 encrypts the secret data using the key so as to generate a ciphertext (Step STM1). The ciphertext storage unit 37 stores the ciphertext thus generated.

The dividing unit 45 divides the ciphertext and the key, so as to generate the divided ciphertexts and the divided keys (Step STM2). The dividing unit 45 divides the ciphertext E into m multiple divided ciphertexts $E_q$ (q=1, . . . , m) based on the (s, m)-type secret sharing scheme. The original ciphertext can be reconstructed based on s multiple pieces from among the m multiple divided ciphertexts $E_q$. Furthermore, the dividing unit 45 divides the key K into n multiple divided keys $K_q$ (q=1, . . . , m) based on the (t, n)-type secret sharing scheme. The key can be reconstructed based on t multiple pieces from among the n multiple divided keys $K_q$. The divided ciphertext storage unit 39 stores the divided ciphertexts. The divided key storage unit 41 stores the divided keys. Here, "m" represents an integer, and "s" represents an integer that is equal to or greater than 2 and that is smaller than m. Moreover, "n" represents an integer, and "t" represents an integer that is equal to or greater than 2 and that is smaller than n. For simplicity of description, description will be made assuming that s=t and m>n hold true, the number of the divided ciphertexts is larger than that of the divided keys, and the key can be reconstructed based on the s multiple divided keys, as with the reconstruction of the ciphertext.

The distribution unit 47 generates pairs $S_q$ (q=1, . . . , m) each of which is formed of the divided ciphertext and the divided key (Step STM3). Specifically, the pairs are generated such that $S_q=(E_q, K_q)$ (q=1, ..., n−1), and such that $S_q=(E_q, K_n)$ (q=n, ..., m). That is to say, the pairs of $E_q$ and $K_q$ (q=1, ..., n−1) are generated such that each piece of divided encrypted data $E_q$ is paired with the corresponding different divided key data $K_q$. Such pairs thus generated such that each piece of divided encrypted data $E_q$ is paired with the corresponding different piece of divided key data $K_q$ will be referred to as "equal pairs". In contrast, the pairs of $E_q$ (q=n, ..., m) and $K_n$ are generated. In this case, $K_n$ is used to generate multiple pairs. Such pairs generated such that a particular divided ciphertext and/or a particular divided key are/is used to generate multiple pairs will be referred to as "unequal pairs". The pairs $S_q$ are generated as a combination of equal pairs and unequal pairs.

Subsequently, the distribution unit 47 distributes the pairs $S_q$ to the servers and the reconstruction apparatuses (Step STM4).

The distribution unit 47 transmits s multiple pairs selected from among the equal pairs $S_q$ (q=1, ..., n−1) to the top server group 11. Furthermore, the distribution unit 47 transmits the (m−n+1) multiple unequal pairs to the top server group 11. The top server group 11 stores the pairs $S_q$ thus received. The secret data can be reconstructed based on the information stored in the top server group 11. It should be noted that a single server does not manage all the pairs. Instead, (s+m−n+1) multiple servers each store only a single pair. Also, in order to reduce the costs of the servers, each server may store multiple linked pieces of data so long as the number of the linked pieces of data to be stored in each server is smaller than a threshold value. Such an arrangement also prevents each server alone from encrypting and decoding the secret data. However, this arrangement leads to an increased risk from the viewpoint of security. In contrast, the unequal pairs have a common divided key $K_n$. Accordingly, the secret data cannot be reconstructed even if s multiple unequal pairs are acquired.

The distribution unit 47 transmits (s−1) or less multiple pairs from among the equal pairs to the leader server group 13. The leader server group 13 stores $S_q$ thus received. Description will be made below regarding an example in which the (s−1) multiple pairs are transmitted to the (s−1) multiple servers, and each server stores the corresponding one pair. The secret data cannot be reconstructed based on the information stored in the leader server group 13.

In a case in which the information of one unequal pair is added to the information stored in the leader server group 13, the secret data can be reconstructed. Accordingly, the secret data can be reconstructed even if a malfunction occurs in the servers that each store an equal pair. That is to say, such an arrangement exhibits improved fault tolerance. It should be noted that, to be exact, the secret data can be reconstructed if the information of only one equal information pair that is not stored in the leader server group 13 is added. Accordingly, in this example, this arrangement requires only one pair as an additional piece of information from among the pairs stored in the top server group 11, which is not stored in the leader server group 13, to reconstruct the secret data after access permission is acquired.

Description will be made with reference to FIGS. 2B and 3B regarding an example of the configuration and the operation of the server.

A server 61 includes a pair storage unit 63, a reception unit 65, and a transmission unit 67. The reception unit 65 receives a pair of the divided ciphertext and the divided key from the distribution unit 47 of the ciphertext management apparatus 31 (Step STS1), and stores the pair thus received in the pair storage unit 63 (Step STS2). Upon receiving a request from a reconstruction apparatus 71 having access permission, the transmission unit 67 transmits the pair of the divided ciphertext and the divided key to the reconstruction unit 71 (Step STS3).

Description will be made with reference to FIGS. 2C and 3C regarding an example of the configuration and the operation of the reconstruction apparatus. The reconstruction apparatus 71 includes a divided ciphertext storage unit 73, a divided key storage unit 75, a ciphertext storage unit 77, a key storage unit 79, a secret data storage unit 81, a reception unit 83, a reconstruction unit 85, and a decoding unit 87. The secret data is displayed on an unshown display unit.

The reception unit 83 receives a pair of the divided ciphertext and the divided key from the server. The divided ciphertext storage unit 73 stores the divided ciphertext. The divided key storage unit 75 stores the divided key. The reconstruction unit 85 reconstructs the ciphertext and the key from the divided ciphertexts and the divided keys. The decoding unit 87 decodes the ciphertext stored in the ciphertext storage unit 77 using the key stored in the key storage unit 79, so as to generate the secret data. The secret data storage unit 81 stores the secret data.

Referring to FIG. 3C, description will be made regarding an example of the operation of the top reconstruction apparatus 21. The secret data can be reconstructed based on the information of the equal pairs. Accordingly, the reception unit 83 of the top reconstruction apparatus 21 accesses the top server group 11 so as to receive the equal pairs $S_q$ (Step STF1). The divided ciphertexts and the divided keys thus received are stored in the divided ciphertext storage unit 73 and the divided key storage unit 75, respectively. The reconstruction unit 85 reconstructs the ciphertext and the key using the divided ciphertexts and the divided keys, and stores the ciphertext and the key thus reconstructed in the ciphertext storage unit 77 and the key storage unit 79, respectively (Step STF2). The decoding unit 87 decodes the ciphertext using the key so as to generate the secret data, and stores the secret data thus obtained in the secret data storage unit 81 (Step STF3).

Referring to FIG. 3C, description will be made regarding an example of the operation of the leader reconstruction apparatus 23. The reception unit 83 receives s multiple pairs $S_q$ (Step STF1). First, the reception unit 83 receives (s−1) multiple pairs $S_q$ stored in the leader server group 13. After receiving permission to access the servers from the top, the reception unit 83 receives a different single pair $S_q$. The reception unit 83 stores each divided ciphertext and each divided key thus received in the divided ciphertext storage unit 73 and the divided key storage unit 75, respectively. The reconstruction unit 85 reconstructs the ciphertext and the key using the divided ciphertexts and the divided keys, and stores each ciphertext and each key in the ciphertext storage unit 77 and the key storage unit 79, respectively (Step STF2). The decoding unit 87 decodes the ciphertext using the key so as to generate the secret data, and stores the secret data thus obtained in the secret data storage unit 81 (Step STF3).

Referring to FIG. 3C, description will be made regarding an example of the operation of the follower reconstruction apparatus 25. Initially, each follower has no access permission. With permission from the top and the leader, the follower acquires permission to access the servers only to receive the s multiple pairs. The reception unit 83 receives s multiple pairs $S_q$ (Step STF1). For example, after the follower acquires permission from the top, the reception unit 83 receives the $S_q$, which is one from among the unequal pairs. The follower acquires permission to access the leader server group 13 from the leader. Subsequently, the follower accesses the servers managed by the leader so as to receive the remaining (s−1) multiple pairs $S_q$. The reception unit 83 stores the divided ciphertexts and the divided keys thus received in the divided ciphertext storage unit 73 and the divided key storage unit 75, respectively. The reconstruction unit 85 reconstructs the ciphertext and the key using the divided ciphertexts and the divided keys, and stores the ciphertext and the key thus reconstructed in the ciphertext storage unit 77 and the key storage unit 79, respectively (Step STF2). The decoding unit 87 decodes the ciphertext using the key so as to generate the secret data, and the secret data thus obtained is stored in the secret data storage unit 81 (Step STF3).

It should be noted that description has been made in the present embodiment regarding an example in which each server stores a pair of the divided ciphertext and the divided key, and supports the security management including the access control operation. For example, such a pair of the divided ciphertext and the divided key may be stored in a portable recording medium such as USB memory or the like. Also, the reconstruction apparatus may read out the pairs from such a recording medium so as to perform decoding processing or the like.

Next, referring to FIG. 4 and Table 1, description will be made regarding the present invention with reference to an example. The symbol IDA (t, m) represents an IDA scheme as proposed by Rabin in which the information is divided into m multiple pieces of information, and the original information can be regenerated using t multiple pieces of information. The symbol PSS(s, n) represents a PSS scheme as proposed by Shamir in which the information is divided into n multiple pieces of information, and the original information can be regenerated using t multiple pieces of information. Description will be made regarding an example in which the organization has one president ($L_1$), one division manager ($L_2$), and two staff members ($L_{31}$ and $L_{32}$).

First, description will be made with reference to FIG. 4 regarding an example of the configuration and the operation of the ciphertext management system in this example. A ciphertext management system 101 includes an information generating apparatus 103, a ciphertext management apparatus 105, a server group 107, a decryption apparatus 109, and a display apparatus 111.

The information generating apparatus 103 includes a plaintext storage unit 113 and a plaintext processing unit 115. The plaintext storage unit 113 stores the secret data. The plaintext processing unit 115 supports processing such as editing of the secret data. An author of the document generates a document using the information processing apparatus, and transmits the document thus generated to the ciphertext management apparatus 105 in order to encrypt the document.

The ciphertext management apparatus 105 includes an encryption unit 117, a dividing unit 119, and a distribution unit 121. The encryption unit 117, the dividing unit 119, and the distribution unit 121 operate in the same manner as those of the encryption unit 43, the dividing unit 45, and the distribution unit 47 shown in FIG. 2. This arrangement performs encryption processing and dividing processing for the secret data stored in the plaintext storage unit 113, so as to generate the divided ciphertexts and divided keys. The distribution unit 121 generates the pairs of the divided ciphertext and the divided keys, and distributes the pairs to the respective servers of the server group 107.

In this example, the server group 107 includes five servers, i.e., the server 1, . . . , the server 5.

Specific description will be made regarding the dividing processing and the distribution processing. In this example, the threshold value is set to 2, and the division number for the ciphertext is set to 5, and the division number for the key is set to 4.

(Dis1) First, the secret key K is selected at random. The secret data S is encrypted using an encryption function ENC and the key K as represented by $E=ENC_K(S)$.

(Dis2) E is divided into five pieces, i.e., $E_1$, $E_2$, $E_3$, $E_4$, and $E_5$ by means of the IDA(2, 5).

(Dis3) The key K is divided into four pieces, i.e., $K_1$, $K_2$, $K_3$, and $K_4$ by means of the PSS(2, 4) as proposed by Shamir.

(Dis4) The pairs $S_k$ are each generated as a pair of the dispersed ciphertext and the dispersed key. In this example, $S_1=(E_1, K_1)$, $S_2=(E_2, K_2)$, $S_3=(E_3, K_3)$, $S_4=(E_4, K_4)$, and $S_5=(E_5, K_4)$, are generated.

(Dis5) The pairs $S_k$ are distributed to the respective servers.

Table 1 shows the pairs of the divided ciphertext and the divided key each of which is to be stored in the corresponding server. The symbol "♦" represents a pair stored in each server. The symbol "↑" represents a pair Sk to be acquired by accessing a server managed by another player after acquiring permission from the manager.

The server 1 stores $S_1$, the server 2 stores $S_2$, the server 3 stores $S_3$, the server 4 stores $S_4$, and the server 5 stores $S_5$. The player $L_1$ manages access to the servers 1, 2, 4 and 5. The player $L_2$ manages access to the server 3. The player $L_1$ gives the player $L_2$ permission to access the server 2. The player $L_1$ gives the player $L_{31}$ permission to access the server 4. The player $L_1$ gives the player $L_{32}$ permission to access the server 5. The player $L_2$ give the player $L_3$ permission to access the server 3.

TABLE 1

| | SERVER 1 | SERVER 2 | SERVER 3 | SERVER 4 | SERVER 5 |
|---|---|---|---|---|---|
| [$E_i$, $K_i$] | [$E_1$, $K_1$] | [$E_2$, $K_2$] | [$E_3$, $K_3$] | [$E_4$, $K_4$] | [$E_5$, $K_4$] |
| $L_1$ | ♦ | ♦ | | ♦ | ♦ |
| $L_2$ | | ↑ | ♦ | | |
| $L_{31}$ | | | ↑ | ↑ | |
| $L_{32}$ | | | ↑ | | ↑ |

The player $L_1$ (president) has two divided pieces of information that can be used to regenerate the secret information. Accordingly, the player $L_1$ is able to regenerate the secret information at a desired timing. The player $L_2$ (division manager) is not able to regenerate the secret information by himself/herself alone. The player $L_2$ is required to use one divided piece of information from the server 2 managed by the president. The player $L_3$ (staff member) is not able to regenerate the secret information by himself/herself alone. The player $L_3$ is required to use one divided piece of information from the server 3 managed by the division manager. The two players $L_3$ are not able to regenerate the secret information by themselves alone even if the divided pieces of information assigned to the two players $L_3$ are used. This is because the divided pieces of information assigned to the two players $L_3$, i.e., $S_4=S(E_4, K_4)$ and $S_5=S(E_5, K_4)$, have the same key. If the player $L_{32}$ leaks his/her divided piece of information, the divided piece of information thus leaked includes $E_5$. Accordingly, judgment can be made regarding who has leaked the divided piece of information.

The reconstruction apparatus 109 includes a reception unit 123, a reconstruction unit 125, and a decoding unit 127. The reception unit 123 transmits a download request to the server group. After the player is authenticated, the reception unit 123 downloads the pairs of the divided ciphertext and the divided key.

When the player $L_1$ is authenticated as a user, the servers 1 and 2 permit downloading of the divided pieces of information stored therein. When the player $L_2$ is authenticated as a user, the server 2 permits downloading of the divided piece of information stored therein. When the player $L_2$ or $L_3$ is authenticated as a user, the server 3 permits downloading of the divided piece of information stored therein. When the player $L_{31}$ or $L_{32}$ is authenticated as a user, the server 4 or 5 permits downloading of the divided piece of information stored therein.

Figure 2:
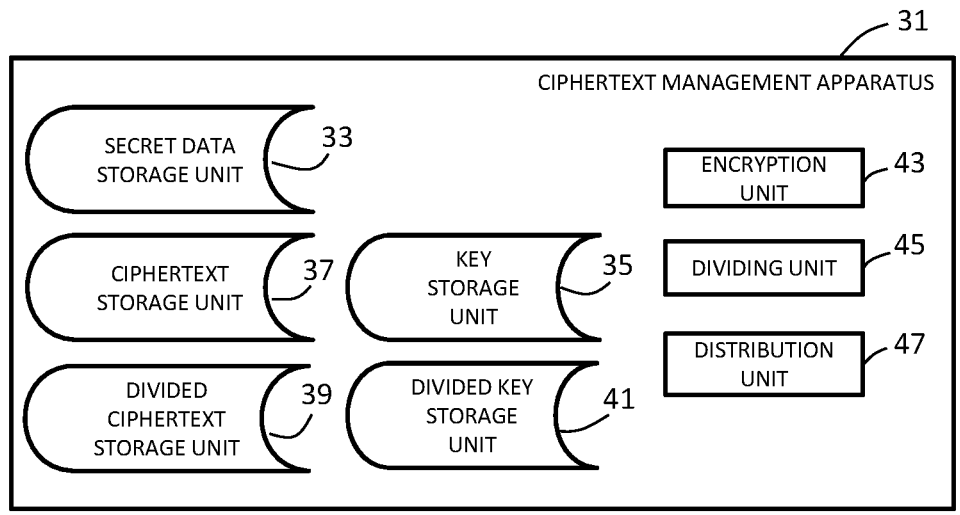
FIG. 2A is a block diagram showing a ciphertext management apparatus 3 shown in FIG. 1.
FIG. 2B is a block diagram showing each server of a server group 5.
FIG. 2C is a block diagram showing an example of the configuration of each reconstruction apparatus of a reconstruction apparatus group 7.
Figure 2:
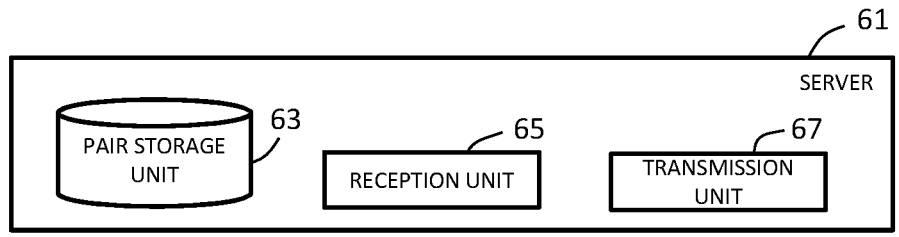
Figure 2:
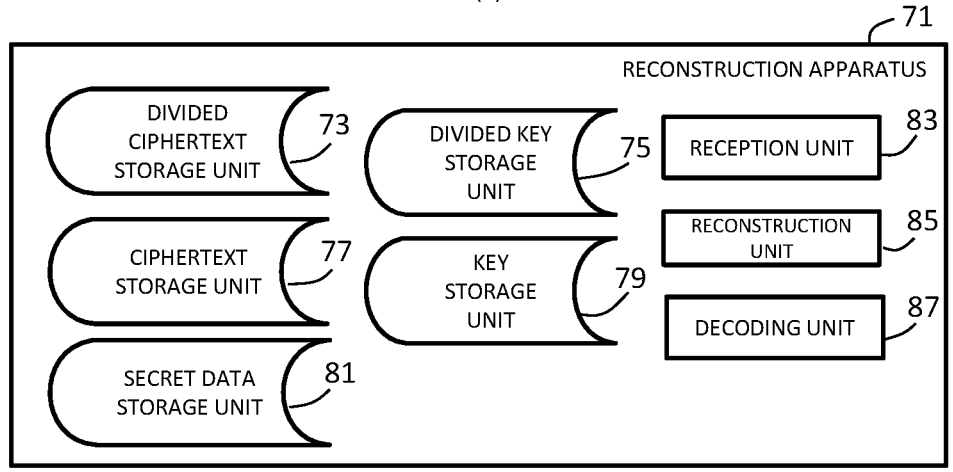
Figure 3:
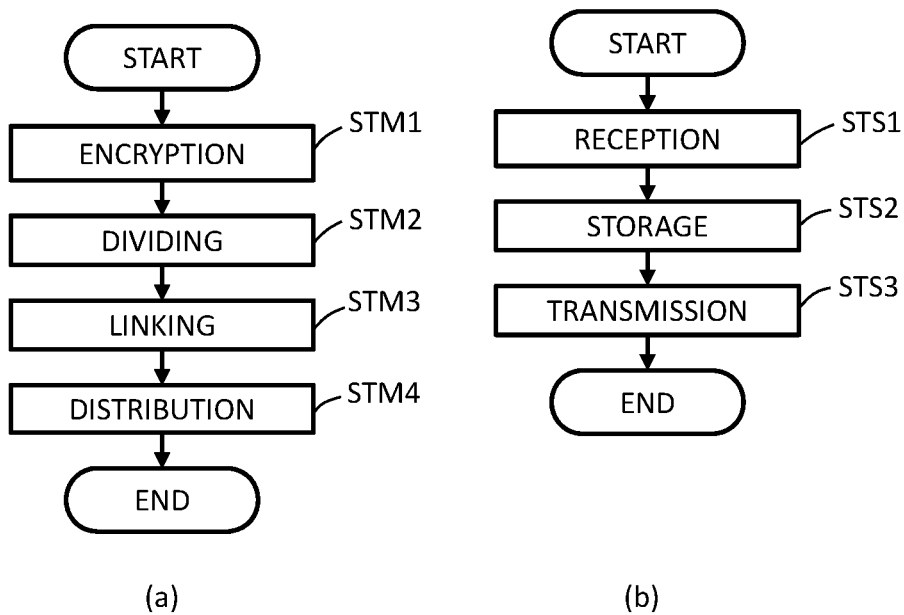
FIG. 3A is a flowchart showing an example of the operation of the ciphertext management apparatus 3 shown in FIG. 1.
FIG. 3B is a flowchart showing an example of the operation of the server.
FIG. 3C is a flowchart showing an example of the operation of each of a top reconstruction apparatus 21, a leader reconstruction apparatus 23, and a follower reconstruction apparatus 25.

The reconstruction unit 125 and the decoding unit 127 operate in the same manner as the reconstruction unit 85 and the decoding unit 87 shown in FIG. 2. Specifically, the ciphertext and the key are reconstructed from the divided ciphertexts and the divided keys thus downloaded, the number of which matches the threshold number. The original secret data is decoded using the ciphertext and the key thus reconstructed.

The display unit 111 displays the secret data thus decoded.

After the player $L_2$ prohibits access by the player $L_3$ to the server 3, each of the players $L_{31}$ and $L_{32}$ is not able to reconstruct the secret data by himself/herself alone. Furthermore, even if they cooperate with each other, they are not able to reconstruct the secret data because the divided pieces of information managed by them include the same key $K_4$. That is to say, there is inequality. Accordingly, when an emergency such as information leakage has occurred, by disabling access to the server 3, this arrangement is capable of preventing information leakage.

Figure 4:
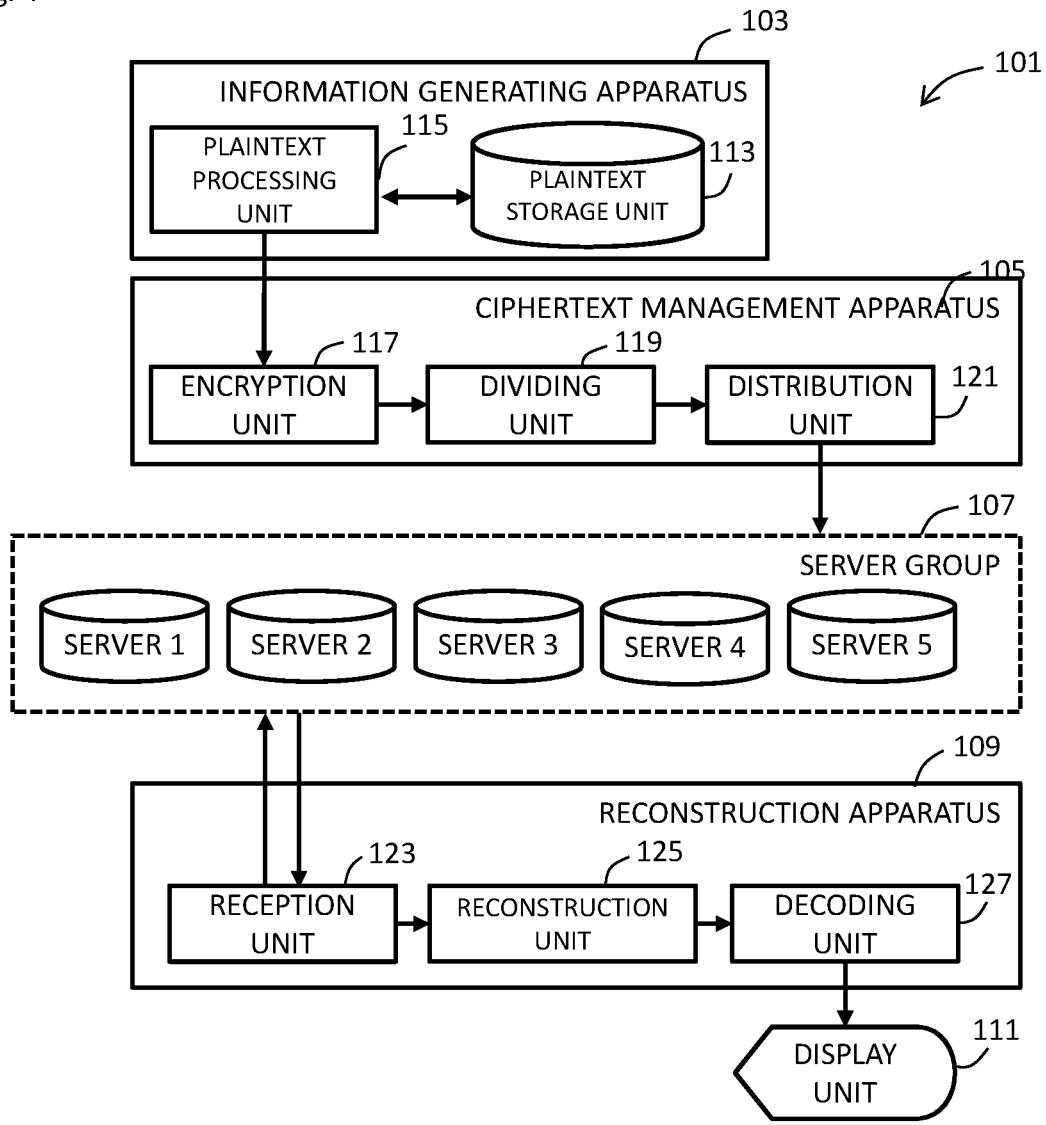
FIG. 4 is a diagram showing a configuration of the ciphertext management system according to an example of the present invention.

It should be noted that, in FIG. 4, the information generating apparatus 103, the ciphertext management apparatus 105, and the reconstruction apparatus 109 may be configured as separate systems (personal computers). Also, in order to prevent information leakage in communication, such apparatuses may be configured as function components included in a single system (personal computer). When only viewing of information is to be performed, this begins with the reconstruction apparatus 109 transmitting a download request.

It should be noted that the present embodiment can be easily generalized. That is to say, description has been made in the present embodiment regarding a case in which the pairs of the divided ciphertext and the key are generated such that the unequal pairs have a single divided key and multiple divided ciphertexts. Also, the unequal pairs may have a single divided ciphertext and multiple different divided keys. Also, the unequal pairs may have multiple different divided keys and multiple different divided ciphertexts. It should be noted that, in the actual operation, it is assumed that such unequal pairs are to be accessed by players having the potential to cause information leakage. Accordingly, from the viewpoint of security management, the unequal pairs are preferably generated at least such that the number of the divided ciphertexts is smaller than "s" or such that the number of the divided keys is smaller than "t". With this arrangement, even if the players that are allowed to access the unequal pairs gather together, either the ciphertext or the key, or both cannot be reconstructed. Accordingly, in order to reconstruct the secret data, such a player must acquire permission to access the equal pairs. Thus, by appropriately managing the equal pairs, this arrangement supports security management.

For example, the ciphertext is divided based on the (3,7)-type secret sharing scheme, so as to generate the divided ciphertexts $E_1$ through $E_7$. The key is divided based on the (3,5)-type secret sharing scheme, so as to generate the divided keys $K_1$ through $K_5$. Subsequently, the equal pairs $(E_1, K_1)$, $(E_2, K_2)$, and $(E_3, K_3)$ are generated. As the unequal pairs, the pairs $(E_4, K_4)$, $(E_5, K_4)$, $(E_6, K_5)$, and $(E_7, K_5)$ may be generated, for example. With this arrangement, the followers of team 1 may be permitted to access the pairs including the divided key $K_4$, and the followers of team 2 may be permitted to access the pairs including the divided key $K_5$, for example. That is to say, this arrangement is capable of supporting a horizontal organization structure having same-level divisions, in addition to a vertical hierarchical structure. Also, by generating the unequal pairs $(E_4, K_4)$ ..., $(E_7, K_4)$, $(E_4, K_5)$, ..., $(E_7, K_5)$, for example, this arrangement is capable of dramatically increasing the number of the unequal pairs.

Description has been made in the present embodiment regarding an arrangement in which the ciphertext and the key are respectively divided based on the IDA scheme and the PSS scheme according to the method proposed by Krawczyk. However, the present invention can be provided using any desired algorithm or method of secret sharing in which the secret data is divided into n multiple pieces, and the secret data can be reconstructed based on t multiple pieces thus divided. For example, a ramp scheme may be employed. For example, in 1997, Rivest proposed AONT, which is recognized as a safe (n,n)-type secret sharing method that is only computationally secure. Furthermore, AONT-RS has been proposed, in which RS coding is applied as post processing. The present invention can also be provided using AONT or AONT-RS. In this case, for example, the secret sharing proposed by Shamir is applied to the key of keyed-AONT, the initial value of which can be used as a private key.

REFERENCE SIGNS LIST

1 ciphertext management system, 3 ciphertext management apparatus, 5 server group, 7 reconstruction apparatus group, 11 top server group, 13 leader server group, 21 top reconstruction apparatus, 23 leader reconstruction apparatus, 25 follower reconstruction apparatus, 31 ciphertext management apparatus, 33 secret data storage unit, 35 key storage unit, 37 ciphertext storage unit, 39 divided ciphertext storage unit, 41 divided key storage unit, 43 encryption unit, 45 dividing unit, 47 distribution unit, 61 server, 63 pair storage unit, 65 reception unit, 67 transmission unit, 71 reconstruction apparatus, 73 divided ciphertext storage unit, 75 divided key storage unit, 77 ciphertext storage unit, 79 key storage unit, 81 secret data storage unit, 83 reception unit, 85 reconstruction unit, 87 decoding unit, 101 ciphertext management system, 103 information generating apparatus, 105 ciphertext management apparatus, 107 server group, 109 reconstruction apparatus, 111 display unit, 113 plaintext storage unit, 115 plaintext processing unit, 117 encryption unit, 119 dividing unit, 121 distribution unit, 123 reception unit, 125 reconstruction unit, 127 decoding unit.

The invention claimed is:

1. A ciphertext management method for managing ciphertext data, comprising:

encrypting, by means of an encryption unit included in a ciphertext management apparatus, secret data using key data so as to generate the ciphertext data;

dividing, by means of a dividing unit included in the ciphertext management apparatus, the ciphertext data and the key data so as to generate m (m represents an integer) pieces of divided ciphertext data and n (n represents an integer) pieces of divided key data; and linking, by means of a distribution unit included in the ciphertext management apparatus, the divided ciphertext data and the divided key data, storing, by means of a pair storage unit, pairs of the divided ciphertext data and the divided key data, transmitting, by means of a transmission unit, the pairs of the divided ciphertext data and the divided key data to a reconstruction unit, reconstructing, by means of the reconstruction unit, pairs of the ciphertext data and the key data from the pairs of the divided ciphertext data and the divided key data, wherein, in the linking, equal pairs are generated such that each piece of divided ciphertext data and each piece of divided key data are used only once to perform pairing, wherein unequal pairs are generated such that one piece from among at least one from among the divided ciphertext data and the divided key data is used multiple times to perform pairing, wherein, in the dividing, the dividing unit divides the ciphertext data and the key data such that the ciphertext data can be reconstructed based on s (s represents an integer that is equal to or greater than 2 and that is smaller than m) pieces of divided ciphertext data, and such that the key data can be reconstructed based on t (t represents an integer that is equal to or greater than 2 and that is smaller than n) pieces of divided key data, wherein, in the linking, all the unequal pairs are generated such that the number of the pieces of divided ciphertext data to be used is smaller than s and/or the number of the pieces of divided key data to be used is smaller than t, and wherein, in the transmitting, in a case that the reconstruction unit has a permission to one or more unequal pairs and no permission to equal pairs, the transmission unit transmits one or more equal pairs after the reconstruction unit acquires a permission to one or more equal pairs.

2. The ciphertext management method according to claim 1, wherein, in the dividing, the number of the pieces of divided ciphertext data differs from the number of pieces of the divided key data, wherein, in the linking, in a case in which n>m, the distribution unit respectively pairs (m−1) pieces of divided ciphertext data with (m−1) pieces of divided key data so as to generate (m−1) equal pairs, and pairs the other (n−m+1) pieces of divided ciphertext data with the remaining one piece of divided key data so as to generate (n−m+1) unequal pairs, and wherein, in the linking, in a case in which n<m, the distribution unit respectively pairs (n−1) pieces of divided ciphertext data with (n−1) pieces of divided key data so as to generate (n−1) equal pairs, and pairs the remaining one piece of divided ciphertext data with the remaining (m−n+1) pieces of divided key data so as to generate (m−n+1) unequal pairs.

* * * * *